United States Patent [19]

Pratt

[11] Patent Number: 5,481,905

[45] Date of Patent: Jan. 9, 1996

[54] TRANSDUCER CIRCUIT HAVING NEGATIVE INTEGRAL FEEDBACK

[75] Inventor: Bud E. Pratt, Pinckney, Mich.

[73] Assignee: Philips Electronics North America Corporation, New York, N.Y.

[21] Appl. No.: 970,746

[22] Filed: Nov. 3, 1992

[51] Int. Cl.⁶ .................................................. G01P 15/00
[52] U.S. Cl. ...................................... 73/115; 73/900
[58] Field of Search ............................ 73/115, 35 P, 715, 73/717, 719, 720, 723, 725, 726, 727, 900, 204.11, 204.15, 204.18

[56] References Cited

U.S. PATENT DOCUMENTS

| | | | |
|---|---|---|---|
| 3,363,462 | 1/1968 | Sabin | 73/204.15 |
| 3,645,133 | 2/1972 | Simeth et al. | 73/204.15 |
| 4,131,088 | 12/1978 | Reddy | 73/719 |
| 4,190,796 | 2/1980 | Ishii | 73/726 |
| 4,213,348 | 7/1980 | Reinertson et al. | 73/726 |
| 4,217,783 | 8/1980 | Ito et al. | 73/726 |
| 4,311,980 | 1/1982 | Prudenziati | 338/4 |
| 4,321,832 | 3/1982 | Runyan | 73/726 |
| 4,500,864 | 2/1985 | Nakane et al. | 73/726 |
| 4,574,640 | 3/1986 | Krechmery | 73/708 |
| 4,703,650 | 11/1987 | Dosjoub et al. | 73/726 |
| 4,765,188 | 8/1988 | Krechmery et al. | 73/708 |
| 4,766,655 | 8/1988 | Hickox | 29/25.35 |
| 4,798,093 | 1/1989 | Kenoun | 73/720 |
| 4,807,470 | 2/1989 | Kleinhans | 73/204.15 |
| 4,843,881 | 7/1989 | Hubbard | 73/204.15 |
| 4,958,520 | 9/1990 | Trommler et al. | 73/727 |
| 4,993,267 | 2/1991 | Allard et al. | 73/726 |
| 5,001,934 | 3/1991 | Tuckey | 73/721 |
| 5,024,107 | 6/1991 | Bethe | 73/862.65 |
| 5,209,125 | 5/1993 | Kalinoski et al. | 73/720 |
| 5,237,867 | 8/1993 | Cook, Jr. | 73/204.15 |
| 5,253,532 | 10/1993 | Kamens | 73/727 |
| 5,359,891 | 11/1994 | Yamamoto et al. | 73/204.15 |
| 5,440,935 | 8/1995 | Petersen | 73/900 |

Primary Examiner—Richard Chilcot
Assistant Examiner—G. Dombroske
Attorney, Agent, or Firm—Robert J. Kraus

[57] ABSTRACT

A transducer circuit which includes a Wheatstone bridge balanced by negative integral feedback. The bridge includes responsive elements formed on a thin resilent diaphragm. When subjected to a force, the diaphragm deflects and unbalances the bridge. The unbalanced bridge produces an output voltage which drives an integrator having an output voltage that is an integral of the bridge output voltage. The integrator output voltage is applied to the bridge as negative feedback to rebalance the bridge. The integrator includes a capacitor which introduces a time delay to assure that the feedback is always negative. The negative feedback provides stability for the circuit. The integrator output voltage drives indicating and/or auxiliary devices. The complete transducer circuit may be disposed within a sealed module having the diaphragm as a surface.

21 Claims, 6 Drawing Sheets

# TRANSDUCER CIRCUIT HAVING NEGATIVE INTEGRAL FEEDBACK

BACKGROUND OF THE INVENTION

This invention relates in general to sensing devices and in particular to a transducer circuit which includes a balanced bridge.

Sensing devices are used in many places to monitor liquid and gaseous pressures present in machinery. Early devices were mechanical and included a direct coupling between the pressurized media and a pressure display unit, typically a Bourdon tube-gauge. As machines became more complex and pressures increased, the coupling between the media being monitored and the gauge became more difficult. Furthermore, the presence of high pressures in control panels raised safety considerations.

The adoption of sensors, or transducers, that generated an electrical signal proportional to a force solved the coupling and safety problems. The electrical signal so generated is easily transmitted to a remotely located electrically activated gauge.

One type of transducer has a Wheatstone bridge circuit mounted upon a resilent diaphragm. The diaphragm is exposed to the force or pressure being measured. The bridge includes resistive elements which change in value as the diaphragm is deflected by applied pressure. The bridge output is connected to a gauge calibrated to read pressure. Typically, the bridge is balanced for zero output voltage when subjected to zero pressure. As pressure increases, the bridge is unbalanced. The unbalanced bridge produces an output voltage proportional to the applied pressure, which causes the gauge to deflect. Amplification may be included to increase the strength of the bridge signal sufficiently to drive the gauge.

While such a device is simple, it is also susceptible to noise present in the voltage supply and in the pressure being monitored, as occurs in vehicular applications. Vehicle battery voltage varies over a wide range with varying conditions and is accompanied by large alternator and other noise components. Furthermore, both bridge components and amplifiers used in the devices tend to drift, especially in high temperature environments.

Various methods have been developed to desensitize measuring circuits to background noise. Some have involved conversion of the bridge output voltage from an analog to a digital signal. One such method includes feedback of a series of digital signals which are converted to an analog signal. The analog signal is then applied to rebalance the bridge. Concurrent with the feedback, a counter is indexed. When the bridge balance is reestablished, a logic control unit causes the counter to output a value indicative of the applied pressure. These devices have proven to be dependable and accurate; however, the use of converters and the associated digital circuitry results in a complex and expensive measuring device. In mass market applications, such as oil pressure sensors for vehicle engines, a simpler, less expensive, but accurate, device is desired.

SUMMARY OF THE INVENTION

This invention relates to a transducer circuit which includes a sensing bridge balanced by negative integral feedback. The transducer circuit preferably is disposed within a small sealed module which can be mass produced.

The sensing bridge circuit is formed on a thin resilent diaphragm and includes resistive elements that change value when subjected to a force generated as the diaphragm deflects. The bridge is initially balanced to produce a zero output voltage with no diaphragm deflection. When the diaphragm is deflected, a voltage appears across the bridge output.

Each of the bridge output terminals is connected through a resistor to an input terminal of a difference amplifier. A first capacitor is connected between the positive input terminal of the difference amplifier and ground. A second capacitor is connected between the negative input terminal of the difference amplifier and the amplifier output terminal. The capacitors, in conjunction with the resistors connected to each amplifier input terminal, cause the difference amplifier to function as a difference integrator. Thus, the amplifier output voltage is a function of the integral of the bridge output voltage. Because the amplifier functions as an integrator, the amplifier output voltage slews at a rate proportional to the magnitude of the diaphragm deflection. Furthermore, the amplifier output slews in a positive or negative direction as the diaphragm deflection increases or decreases.

The output voltage of the difference amplifier is introduced into an arm of the sensing bridge as negative feedback to reduce the bridge output voltage. Because the difference amplifier output is a function of the integral of the bridge output voltage, the amplifier output voltage closes on a value at which the bridge output signal is driven back to zero by the feedback. The amplifier output voltage remains at that value until the diaphragm deflection changes. The amplifier output voltage can be used to drive instrumentation such as a gauge which indicates the amount of diaphragm deflection.

A small resistor is used to introduce the feedback into the bridge arm with the result that when there is no feedback, the bridge balance is effectively not disturbed. This allows precise trimming of the bridge resistors for the initial bridge balancing independently of the overall transducer circuit gain. The overall transducer circuit gain is adjusted by varying an adjustable feedback resistor. Because the bridge initial balancing and the transducer gain adjustment are operations with only slight interaction, the initial balancing and gain adjustment can be done separately. This simplifies the calibration of the transducer to a noniterative, two step procedure.

The capacitors connected to each of the difference amplifier input terminals introduce a time constant at each input. The time constant for the negative input is longer than the time constant for the positive input by a small amount necessary to insure that only negative feedback occurs in the transducer circuit. This precludes amplified common mode noise signals being applied to the sensing bridge as positive feedback which could cause sensor instability or oscillation.

Depending upon available space, the entire transducer circuit can be either disposed upon the resilent diaphragm or upon two substrates separated by a rigid supporting structure. In the former case, the portion of the diaphragm supporting the nonpressure sensitive elements would be restrained from deflecting. The entire structure can be sealed to form a small monolithic module which is easily mounted in various housings as needed for a particular application.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
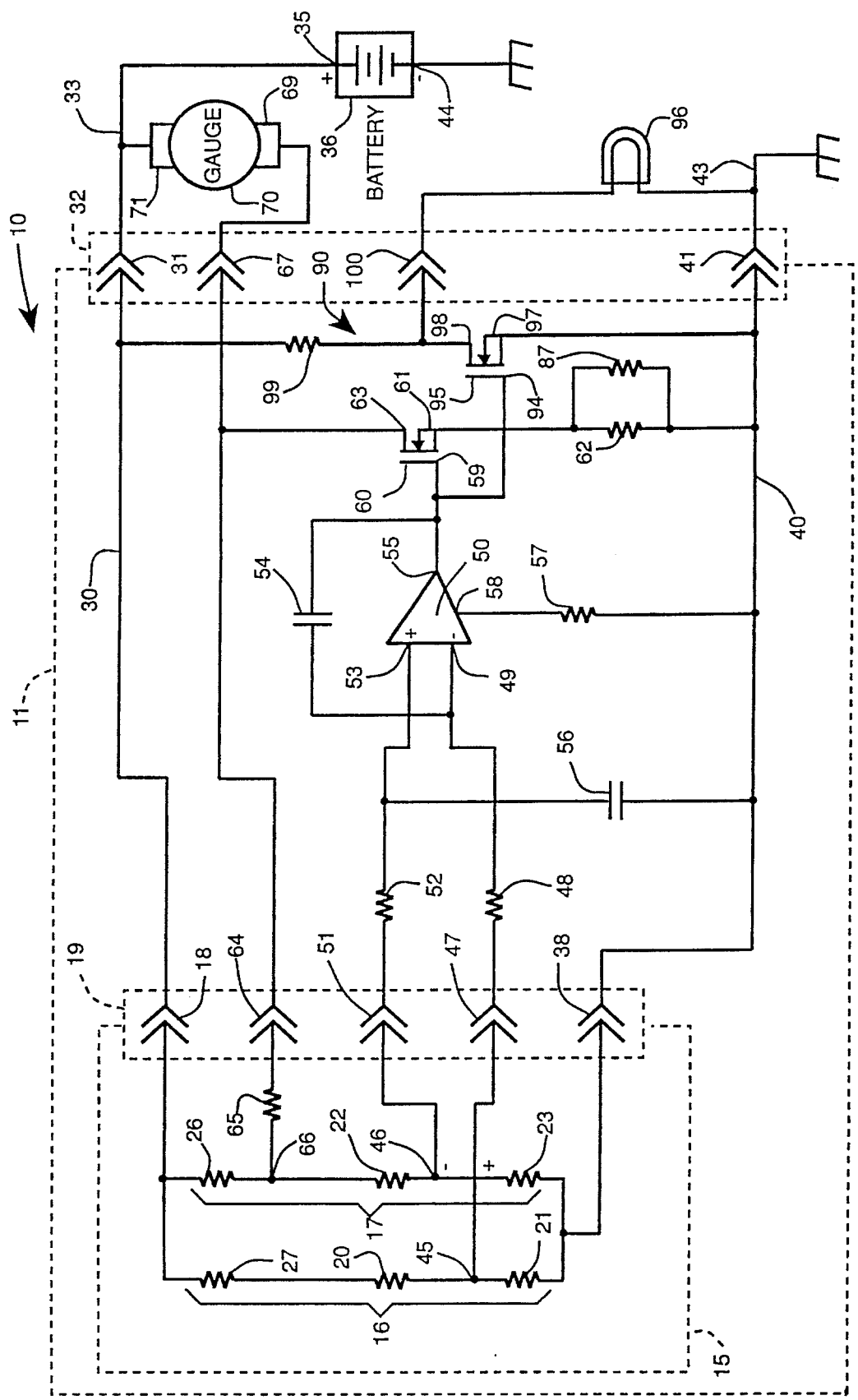
FIG. 1 is a schematic circuit diagram for a transducer circuit in accordance with this invention.

Referring now to the drawings, there is illustrated in FIG. 1 a schematic diagram for a transducer circuit 10 in accordance with this invention. The circuit 10 may be mounted in a sealed module 11 having a perimeter shown as a dashed line in FIG. 1. The circuit 10 includes a conventional Wheatstone bridge 15. The bridge 15 has a left arm 16 and a right arm 17. The left arm 16 includes an upper left sensing resistor 20 and a lower left sensing resistor 21 connected in series. Likewise, the right arm 17 includes an upper right sensing resistor 22 and a lower right sensing resistor 23 also connected in series.

For the embodiment shown, all four sensing resistors 20, 21, 22 and 23 are formed of a stress responsive material having a high resistivity and gauge factor. The material increases in resistive value when subjected to tension and decreases in resistive value when subjected to compression. As will be described below, these stress responsive resistors 20, 21, 22 and 23 are formed on a thin resilent diaphragm (not shown) which is subjected to a variable pressure. In alternate embodiments of the circuit 10, bridge resistors responsive to other conditions may be used. For example, material that responds to temperature changes can be used for a temperature responsive transducer. One of the sensing resistors, shown as 21 in FIG. 1, is adjustable for coarse bridge zeroing. While four bridge resistors in the illustrated embodiment are formed of material responsive to applied stress, the actual number so formed can vary in other embodiments from a minimum of one to a maximum of four.

The upper end of the right bridge arm 17 includes a small bridge feedback resistor 26 which is connected in series to the sensing resistors 22 and 23. The bridge feedback resistor 26 introduces a feedback signal into the bridge circuit, as will be explained below. Similarly, the upper end of the left bridge arm 16 includes a small bridge trim resistor 27 which compensates the left bridge arm 16 for the bridge feedback resistor 26. The bridge trim resistor 27 is also adjustable to more accurately zero the bridge 15. The bridge feedback and trim resistors 26 and 27 are formed from a material which has a lower resistivity and gauge factor than that used for the sensing resistors 20, 21, 22 and 23. This minimizes stress induced changes of value for the bridge feedback and trim resistors 26 and 27. Also, as described below, the different materials have different temperature coefficients which are taken into account for setting the bridge circuit null.

The upper ends of the right and left bridge arms 16 and 17 are connected through a first internal electrical connector 18 to a power supply buss 30. The internal electrical connector 18 is included in a multipath connector 19, which is described below. The power supply buss 30 is connected to a first contact 31 of a multiple contact connector 32 which is mounted upon the sealed module 11. The connector 132 provides an electrical connection between the transducer circuit 10 and external electrical components. The connector 32 can be any one of a number of available designs, which include various multipin connectors and spring clips urged against simple metal contacts. An external supply wire 33 connects the first contact 31 to a power source, such as a positive terminal 35 of a vehicle battery 36. In a vehicular application, an ignition switch (not shown) would disconnect the power source when the vehicle is not being used. In a similar manner, the lower end of the bridge circuit 15 is attached through a second internal electrical connector 38 to a circuit ground buss 40. The ground buss 40 is connected to a second contact 41 of the connector 32. The second contact 41 is connected through an external ground wire 43 or through the vehicle ground to a negative terminal 44 of the battery 36.

The bridge 15 includes a left output terminal 45 formed at the junction of the left arm sensing resistors 20 and 21. The bridge 15 further includes a right output terminal 46 formed at the junction of the right arm sensing resistors 22 and 23. The left bridge output terminal 45 is connected through a third internal electrical connector 47 and a first connecting resistor 48 to a negative input terminal 49 of a amplifier 50 having a differential input and single ended output, or simply, a difference amplifier. The right bridge output terminal 46 is connected through a fourth internal electrical connector 51 and a second connecting resistor 52 to a positive input terminal 53 on the difference amplifier 50.

The difference amplifier 50 is a DC amplifier that is similar to a conventional operational amplifier, but may have internal circuitry that can be simple due to the inherent stability of the circuit 10. An unstabilized, low gain amplifier having low offset drift works quite well. Such an amplifier is best suited for exposure to a high temperature environment, as encountered near vehicle engines.

A first integrating capacitor 54 is connected between the difference amplifier negative input terminal 49 and a difference amplifier output terminal 55. A second integrating capacitor 56 is connected between the positive input terminal 53 and the ground buss 40. These integrating capacitors 54 and 56 in conjunction with the connecting resistors 48 and 52 cause the difference amplifier 50 to function as a difference integrator. Thus, the output voltage from the difference amplifier 50 is a function of the integral of the differential voltage applied to the input terminals 49 and 53. As will be explained below, the difference amplifier output voltage provides a feedback signal which returns the bridge 15 to balance.

The choice of an integrator as a difference amplifier has important benefits for the circuit 10. As opposed to low gain proportional difference amplifiers, it has almost no residual error due to gain deficiency. The DC gain for the integrator is quite high. Therefore, the only error is one due to the input offset voltage for the difference amplifier 50 which can be compensated for with calibration. A resistor 57 is connected between an offset null terminal 58 on the difference amplifier 50 and the ground buss 40 to provide calibration for the input offset voltage. Furthermore, the integrator is a low frequency response device and does not respond to higher frequency noise present in the bridge output signal.

The difference amplifier output 55 is connected to a gate terminal 59 of a power transistor 60 which increases the strength of the difference amplifier output voltage to drive an indicating device or other load. The power transistor 60 also provides an impedance match between the difference amplifier output and the load. While a MOSFET is shown for the power transistor 60, other known devices may be used. The transistor 60 has a source terminal 61 which is connected through a current limiting resistor 62 to the ground buss 40. The limiting resistor 62 reduces the gain of the power transistor 60 to stabilize the feedback dynamics and amplifier slewing rate. This minimizes variations in slewing rates between individual transducer modules 11. The limiting resistor 62 also controls the settling time of the transducer circuit 10, with higher resistive values causing longer settling times. A drain terminal 63 on the transistor 60 is connected through a fifth internal electrical connector 64 and an adjustable feedback resistor 65 to a feedback injection point 66. The injection point 66 is located between the upper right bridge arm resistor 22 and the bridge feedback resistor 26. The feedback resistor 65 provides a feedback path coupling the difference amplifier output 55 to the right arm 17 of the bridge circuit 15. The feedback resistor 65 is formed from the same material as the bridge feedback and trim resistors 26 and 27 and is trimmed to adjust the overall gain for the transducer circuit 10.

The drain terminal 63 is also connected to an output signal connector contact 67. The output signal contact 67 is connected to a first terminal 69 of a gauge 70. The gauge 70 has a second terminal 71 connected to the positive terminal 35 of the battery 36. When the power transistor 60 conducts, current flows from the battery 36 through the gauge 70, through the power transistor 60 and the current limiting resistor 62 to the ground buss 40. As the current flows through the gauge 70, the gauge indicates the pressure sensed by the bridge 15.

Figure 2:
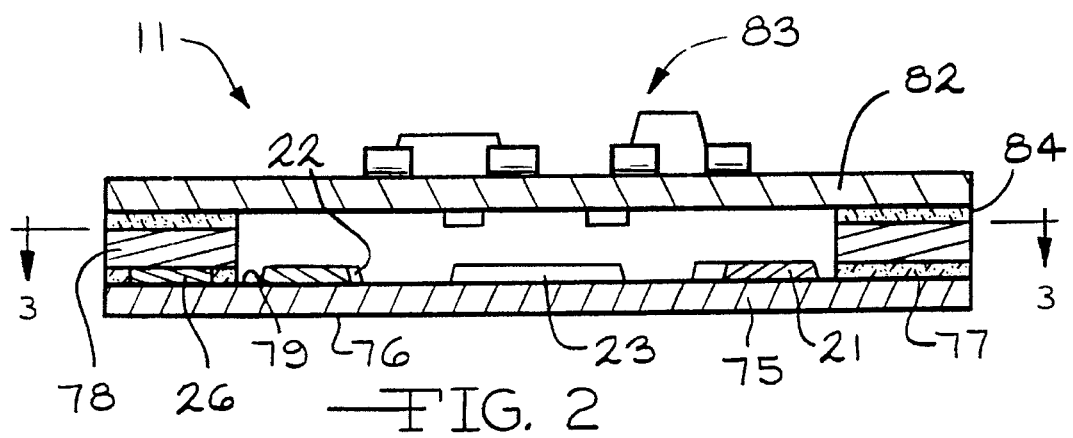
FIG. 2 is a cross-sectional elevational view of a transducer module which includes the circuit shown schematically in FIG. 1.
Figure 3:
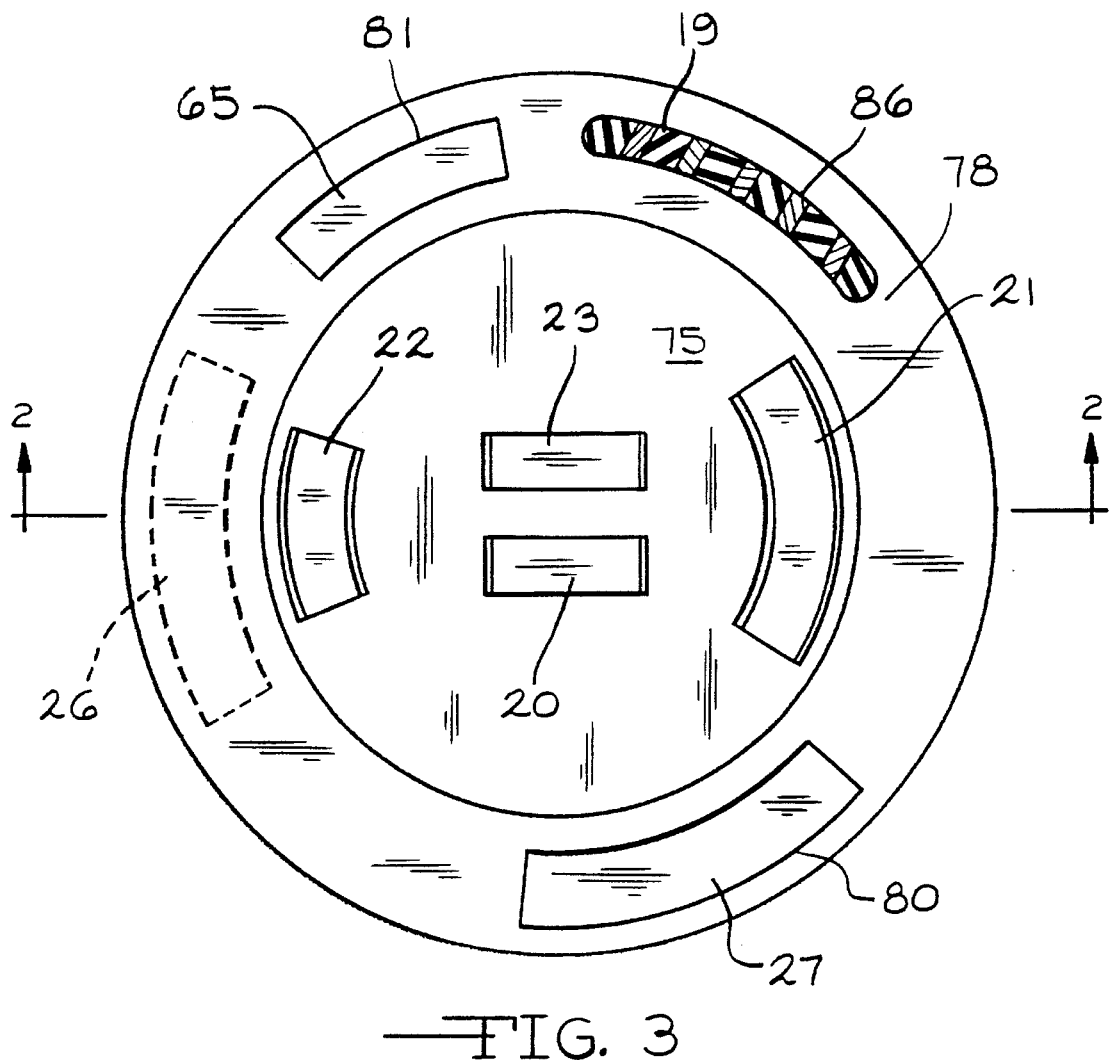
FIG. 3 is a cross-sectional plan view taken along line 3—3 of FIG. 2.

The circuit 10 is compact and can be disposed entirely within a small module 11. The module 11 can be sealed and can be mass produced for use in numerous applications. A preferred configuration for the module 11 is illustrated in FIGS. 2 and 3. As best shown in FIG. 2, the module 11 includes a thin resilent diaphragm 75 functioning as a lower substrate. As best seen in FIG. 3, the diaphragm 75 has a generally circular shape. The diaphragm 75 can be formed in other shapes as required for the particular application. It has been found that automatic resistor trimming machines are best used on objects having straight sides. Thus a regular polygon can be used for the diaphragm 75 to enhance automatic trimming of adjustable circuit resistors. For such cases, a 24 sided regular polygon approximates a circular shape. In the preferred embodiment, the diaphragm 75 is fabricated from aluminum oxide, but other materials, such as sapphire, anodized aluminum, titanium, titanium alloys and coated metals could be used. The other materials have been found to have higher tensile strength and greater flexibility. Titanium and titanium alloys also have especially suitable temperature characteristics.

A first or exterior surface 76 (shown in FIG. 2) of the diaphragm 75 is exposed to an applied pressure which is to be measured. The diaphragm 75 deflects in proportion to the magnitude of the applied force. The outer edge of the diaphragm 75 is fused with a first layer of glass or ceramic and glass frit 77 to a rigid supporting structure 78, shown as an annular ring in FIG. 3. The supporting structure 78 is formed from aluminum oxide in order to have the same temperature expansion coefficient as the diaphragm 75. The supporting structure 78 prevents deflection of the the circumference of the diaphragm 75. Thus, as pressure on the outside surface 76 of the diaphragm 75 increases, the center of the diaphragm 75 is bowed in an upward direction.

As mentioned above, the diaphragm 75 has the sensing bridge 15 secured thereto. The bridge 15 is formed on a second or interior surface 79 opposite the first surface 76 and not directly exposed to the applied force. The bridge resistors 20, 21, 22 and 23 can be formed by a conventional method, such as; etching thin film resistors into the diaphragm 75, screening thick film resistors onto the diaphragm 75, bonding foil resistors to the diaphragm 75, or diffusing resistive material into the second surface 79 of the diaphragm 75. In the preferred embodiment, the sensing resistors 20, 21, 22 and 23 are thick film resistors formed from ruthenium oxide ($RuO_2$) and glass. The addition of other materials such as tungsten oxide, barium titanium oxide or yttrium-iron garnet to the ruthenium oxide can significantly increase the gauge factor for the sensing resistors.

As shown in FIG. 3, the upper left and lower right sensing resistors 20 and 23 are located in the center of the diaphragm 75, where maximum tension occurs as the diaphragm 75 is deflected in an upward direction. The tension causes resistors 20 and 23 to increase in value. The lower left and upper right sensing resistors 21 and 22 are located near the support ring 78 where the compressive strain is maximum as the diaphragm 75 is deflected in an upward direction. The adjustable sensing resistor 21 is located in a compression area of the diaphragm 75 to avoid microcracks which can develop in laser trimmed resistors subjected to tension. The lower left and upper right resistors 21 and 22 have an arcuate shape so that radial compressive strain is uniformly applied to the resistors. Compression causes the resistors 21 and 22 to decrease in value.

For maximum compressive strain sensitivity, the lower left and upper right sensing resistors 21 and 22 would be located against the support ring 78 where the compressive strain is the greatest. However, strain analysis has revealed that mounting forces can be generated when the sealed module 11 is installed in a housing (not shown). Seal pressure and horizontal pressure can cause very slight rotations of the diaphragm 75 relative to the support ring 78, inducing strain in the diaphragm 75. If these pressures are uniform around the support ring 78, the induced compressive strains are equal at all points and are primarily cancelled by the balanced bridge circuit 15. However, very near the inside edge of the support ring 78, a bend radius exists when the diaphragm 75 is deflected where the strain is quite different from all other points on the diaphragm surface. This area can cause uncancelled mounting strains to exist if the sensing resistors 21 and 22 are located too near to the support ring 78. Therefore, the lower left and upper right sensing resistors 21 and 22 are separated from the edge of the support ring 78 by a distance equal to the thickness of the diaphragm 75.

As shown in FIG. 3, the bridge feedback resistor 26 (shown in phantom), the bridge trim resistor 27 and the feedback resistor 65 are all located beneath the support ring 78 where there is no diaphragm deflection. This prevents subjecting these resistors to tension or compression as the diaphragm 75 is deflected. A first trimming slot 80 is formed through the supporting ring 78 to allow access to the bridge trim resistor 27 for trimming. Likewise, a second slot 81 is formed through the supporting ring 78 to allow trimming of the feedback resistor 65. As described above, the adjustable sensing resistor 21 is not under the support ring 78 and is thus accessible for trimming. The adjustable sensing resistor 21, bridge trim resistor 27 and circuit feedback resistor 65 are trimmed by a conventional method, such as laser cutting, sand blasting, etching, or mechanical cutting or scraping. The layer of frit 77 forms a spacer between the diaphragm 75 and the support ring 78 which allows placement of the bridge feedback resistor 26 underneath the ring 78. The layer of frit 77 also allows the ends of the bridge trim and feedback resistors 27 and 65 to extend beyond the trimming slots 80 and 81.

Size restrictions for the preferred embodiment require mounting a portion of the circuit 10 upon a rigid upper substrate 82 formed from aluminum oxide, as shown at 83 in FIG. 2. The upper substrate 82 is fused to the top of the supporting ring 78 by a second layer of glass or glass and ceramic frit 84 after the adjustable resistors 21, 27 and 65 are trimmed. The internal electrical connector 19 is disposed in a connector slot 86 formed through the supporting ring 78 to connect the circuit components on the upper and lower substrates 82 and 75. An elastomeric link consisting of a laminate of alternating elastomer and silver layers has been used successfully for the electrical connector 19. The silver layers provide individual connections between the components located on the two substrates 75 and 82.

The embodiment shown in FIG. 2 is used to minimize the size of the module 11. When more space is available, all circuit components may be disposed upon a single substrate which also functions as the pressure diaphragm.

As discussed above, the bridge feedback, trim and circuit feedback resistors 26, 27 and 65 are formed from different material than the bridge sensing resistors 20, 21, 22 and 23. Because of the different materials used, the temperature coefficients of the bridge trim and feedback resistors 27 and 26 are different from the temperature coefficients for the bridge sensing resistors 20, 21, 22 and 23. This can cause a temperature drift if the trim resistor 27 has a different value than the bridge feedback resistor 26. Furthermore, housing expansion can place small temperature dependent mounting strains on the sensing resistors 20, 21, 22 and 23 resulting in slight positive or negative temperature drifts. The mounting strain effects are partially compensated for by the different temperature coefficients of the bridge trim and feedback resistors 27 and 26. The trim procedure used to zero the bridge circuit 15 compensates for any remaining temperature effects. To zero the bridge circuit 15, the adjustable sensing resistor 21 is first trimmed to provide a particular positive or negative offset voltage, as determined from the remaining temperature effects. Then the bridge trim resistor 27 is trimmed to zero the bridge. After trimming the bridge trim resistor 27, the bridge trim resistor 27 is either less than or greater than the feedback resistor 26. This inequality introduces an offsetting temperature drift to cancel any remaining temperature dependent mounting strain effects upon the sensing resistors 20, 21, 22 and 23. The offset voltage is selected to assure that the trim resistor adjustment compensates the bridge 15 for any remaining strain effects. Thus, both bridge zeroing and temperature compensation adjustments are easily completed in one operation without extra components or adjustment complexities, so that the sensor 10 can be temperature compensated without added expense. If needed, a final offset voltage adjustment can be made after the upper substrate 82 has been attached to the supporting ring 78 by trimming the offset trim resistor 57.

As an alternate to the above described procedure, the bridge trim resistor 27 can be trimmed first, followed by trimming of the adjustable bridge sensing resistor 21. Furthermore, if the bridge output voltage is not available during the trimming operations, the zeroing and temperature compensation can be accomplished with resistance measurements.

The circuit feedback resistor 65 is adjusted to provide full gauge deflection when maximum force is applied to the diaphragm 75. The bridge feedback resistor 26 is purposely small in comparison to the right bridge arm sensing resistors 22 and 23. Thus, the adjustment of the overall circuit gain with the feedback resistor 65 does not effect the zero balance of the bridge circuit 15. The calibration of the circuit 10 for the gauge is separate from the initial balancing of the bridge 16. Therefore, only two steps are required to initially balance and calibrate the circuit 10. An iterative procedure is not needed for calibration which keeps down production costs.

For sensor applications having a gauge for the circuit load, a fairly long slewing rate is desirable for the difference amplifier 50. Accordingly, a relatively high value is used for the current limiting resistor 62. This long slewing time makes high production rate active laser trimming impossible, due to the measurement lag it causes. For this reason, a very low value bypass resistor 87 can be connected in parallel with the current limiting resistor 62 to obtain high slew rates for high speed laser trimming of resistors during circuit calibration. After trimming the resistors, the bypass resistor 87 is removed from the circuit 10 by laser cutting it to produce an open circuit and thereby restore the desired longer slewing rate. While the present embodiment uses a bypass resistor 87, a printed circuit board run or wire jumper could also be used. Alternatively, automatic machinery could short out the current limiting resistor 62 during the trimming operation.

The operation of the circuit 10 will now be described with reference to FIG. 1. Initially, no pressure is applied to the diaphragm 75, and, accordingly, the diaphragm is not deflected. The bridge 15 is initially balanced during assembly so that when a voltage is applied across the bridge and the diaphragm 75 is not deflected, no voltage difference exists between the bridge output terminals 45 and 46. That is to say, the voltage measured from the left bridge output terminal 45 to the ground buss 40 will be the same as the voltage measured from the right bridge output terminal 46 to the ground buss 40. Thus, there is zero voltage between the difference amplifier input terminals 49 and 53. When this is the case, the output voltage at the difference amplifier output 55 terminal is also zero and the power transistor 60 will not be conducting.

As mentioned above, the value of the bridge feedback resistor 26 is purposely small compared to the bridge sensing resistors 22 and 23 which are connected to it. Because of this, there is a very small voltage drop across the bridge feedback resistor 26. Accordingly, since the power transistor 60 is not conducting, approximately the full supply voltage appears at the drain terminal 63 of the power transistor 60. This voltage also appears at the output signal contact 67 which is connected to the first terminal 69 of the gauge 70. The second terminal 71 of the gauge 70 is connected to the battery wire 33. Thus, there is effectively no voltage difference across the gauge 70 and the gauge 70 reads zero. Because only small currents flow through the balanced bridge 15, it is possible to accurately balance the bridge during assembly and the accuracy is maintained with no diaphragm deflection.

When a pressure is applied to the diaphragm 75, the diaphragm deflects, causing the resistances of the upper left and lower right sensing resistors 20 and 23 to increase. Similarly, the resistances of the lower left and upper right sensing resistors 21 and 22 decrease. This unbalances the bridge 15, causing the voltage at the right bridge output terminal 46 to rise while the voltage at the left bridge output terminal 45 drops. The bridge output terminal voltages are applied through the connecting resistors 48 and 52 to the difference amplifier input terminals 49 and 53 and the integrating capacitors 54 and 56. The difference amplifier output voltage magnitude begins to rise as the first and second integrating capacitors 54 and 56 charge. The difference amplifier output voltage is forced by the integrating capacitors 54 and 56 to be a function of the integral of the bridge output voltage. The difference amplifier output voltage slews at an initial rate proportional to the magnitude of the diaphragm deflection.

As the difference amplifier output voltage increases, the power transistor 60 begins to conduct, drawing feedback current through the bridge feedback resistor 26 and the circuit feedback resistor 65. As the current flow through the feedback resistor 65 increases, the total current through the bridge feedback resistor 26 also increases with a corresponding rise in voltage across the resistor 26. As the voltage across the bridge feedback resistor 26 increases, the voltages across the two sensing resistors 22 and 23 in the right arm 17 of the bridge decrease. As these voltages decrease, the voltage at the right bridge output terminal 46 also decreases. Thus, as the power transistor conducts, negative feedback occurs to drive the bridge back into balance. Because the voltage signal at the difference amplifier output 55 is a function of the integral of the bridge voltage, the difference amplifier output signal closes on a value at which the bridge output voltage is driven back to zero by the feedback. As the bridge output signal is driven back to zero, the rate of increase of the difference amplifier output voltage slows, which, in turn, slows the rate of increase of the feedback current.

As current flows through the feedback resistor 65, the voltage at the junction of the feedback resistor 65 and the drain terminal 63 of the power transistor 60 drops. This same voltage appears at the output signal contact 67. As the voltage at the output contact 67 drops, a voltage difference appears across the gauge 70, which will accordingly deflect.

The circuit conditions will remain as described above as long as the pressure applied to the diaphragm 75 remains unchanged. If the pressure increases further, the diaphragm deflection increases, raising the output voltage of the difference amplifier 61. The increase in difference amplifier output causes a larger feedback current which again rebalances the bridge 15. The increased feedback current further lowers the voltage at the output signal contact 67 causing the gauge 70 to read higher.

If, on the other hand, the pressure should decrease, the diaphragm deflection decreases. As the diaphragm deflection decreases, the bridge 15 will be unbalanced in the opposite direction causing a reversal of the voltage polarities applied to the difference amplifier inputs 49 and 53. When this happens, the integrating capacitors 54 and 56 cause the voltage at the output 55 to decrease. The decreasing output voltage causes the power transistor 60 to reduce the feedback current, again rebalancing the bridge. At the same time, the voltage at the output signal contact 67 rises. The rise in voltage at the output signal contact 67 reduces the voltage difference across the gauge terminals 69 and 71 and thereby decreases the indication on the gauge 70.

When the differential voltage applied to the difference amplifier 50 changes, the integrating capacitors 54 and 56 introduce first and second time delays to the voltages applied to the difference amplifier input terminals 49 and 53. The first time delay has a time constant $T_1$ determined by the product of the values of the first integrating capacitor 54 and the first connecting resistor 48 attached thereto. Similarly the second time delay has a time constant $T_2$ determined by the product of the values of the second integrating capacitor 56 and the second connecting resistor 52 attached thereto. These time delays can adversely affect the accuracy of the circuit by shifting one of the difference amplifier inputs in time relative to the other input. The time delays can cause a more serious problem if noise is present. Vehicle electrical circuits often have as much as five volts of alternator noise superimposed upon the DC voltage. Furthermore, the pressure being measured may include a mechanically generated noise component which is detected by the pressure sensitive bridge resistors 20, 21, 22 and 23. The voltages caused by these noise sources are superimposed upon both of the bridge output terminal voltages. As long as the voltages are in time synchronization, the differential input to the difference amplifier 50 causes the noise voltages to cancel each other. This effect is known as common-mode noise rejection. Thus, if one of the inputs is delayed in time with respect to the other, the superimposed noise voltages do not cancel. Instead, the noise voltages pass through the difference amplifier. If the noise signal is of a polarity to cause positive feedback, the transducer circuit 10 can become unstable or even oscillate.

This problem is resolved in conventional circuit design by making the two time constants equal. The resulting equal time delays for the input voltages preserve the common-mode noise rejection feature of the difference amplifier 50 and restore circuit accuracy by resynchronizing the input voltages. However, the use in this invention of the difference amplifier output voltage for feedback raises a potential problem. As discussed above, if $T_1$ should be even slightly less than $T_2$, the circuit 10 could be unstable. The normal variation of component values within production tolerance ranges and imperfect linearity in the circuit 10 make it impossible to balance the two time constants $T_1$ and $T_2$. This lack of balance could be sufficient to destabilize the circuit by introducing positive feedback. In the present invention, $T_2$ is purposely made smaller than $T_1$ to preclude this problem. The magnitude of the difference between the time constants $T_1$ and $T_2$ is determined from an analysis of worse case manufacturing tolerances and expected temperature variations for the circuit components. $T_2$ is made smaller than $T_1$ by the small amount determined from the analysis to prevent positive feedback. The unequal time constants create an imbalance that causes a small amount of noise to be integrated, but applied as negative feedback, leading to a stable circuit. This small time constant difference makes it possible to combine an integrator with the bridge circuit 15. It also allows operation of the transducer circuit 10 from power supplies with widely varying voltage output and very high ripple. An amplifier having a very high gain can be used for high accuracy. Furthermore, the small amount of noise that is integrated is attenuated by the feedback loop gain, so that the noise has little effect upon the circuit accuracy.

As indicated above, sensor applications having a gauge for a load have a long slewing rate, or time constant. Gauge time responses typically approximate an increasing exponential curve with the gauge needle beginning to move slowly and accelerating as time passes. This is because gauges tend to have long time constants due to inherent inductance, inertia and magnetic structure. For such loads, the circuit time constants $T_1$ and $T_2$ can be adjusted to produce an overall time constant for the transducer circuit 10 which is substantially equal to the time constant of the gauge. As described above, the difference amplifier output signal, which drives the transducer power transistor 60, approximates an exponential decay. Thus, the gauge time response is the inverse of the transducer time response. The two exponential time responses combine to produce an approximately linear overall response when the gauge is connected to the transducer circuit 10. The linear response causes the gauge needle to move with a constant velocity. The constant needle velocity eliminates typical apparent lag and overshoot of the gauge needle.

The circuit 10 shown in FIG. 1 also includes an auxiliary device drive, shown generally at 90. In the auxiliary device drive 90, the difference amplifier output terminal 55 is connected to a gate terminal 94 of an auxiliary signal MOSFET transistor 95. The auxiliary signal transistor 95 is selected having a gate characteristic such that the the auxiliary transistor 95 will begin conducting at a lower difference amplifier output voltage than the power transistor 60. The auxiliary signal transistor 95 functions as a switch for a warning light 96. While a MOSFET is shown for the auxiliary signal transistor 95, other devices can be used. The auxiliary signal transistor 95 has a source terminal 97 connected to the ground buss 40 and a drain terminal 98 connected through a current limiting resistor 99 to the power supply buss 30. The junction of the current limiting resistor 99 and the drain terminal 98 is connected to a warning light output contact 100 which is disposed within the multiple contact connector 32. The warning light 96 is connected between the contact 100 and the ground wire 43.

When the diaphragm deflection is small, the auxiliary signal transistor 95 does not conduct and the light 96 is illuminated. As the diaphragm deflection increases, the transistor 95 begins conducting, bypassing and thereby extinguishing the light 96. The difference in the gate characteristics of the transistors 60 and 95 causes the auxiliary signal transistor 95 to begin conducting before the power transistor 60. This assures that the warning light 96 is extinguished before the gauge 70 begins to display a reading. As a further refinement, the value of the auxiliary transistor gate voltage can be chosen such that the light 96 is extinguished when the diaphragm deflection reaches a predetermined value. The predetermined value can represent, for example, a minimum safe oil pressure.

The embodiments described have used voltage feedback so that gauge coil resistance changes do not affect reading accuracy. The gauge 70 includes two coils (not shown). One coil is a reference coil and is connected directly across the battery terminals 35 and 44. The other coil is a signal coil and is attached to the output signal contact 67. The coil winding resistances increase with temperature increases. The resulting decrease in reference coil current makes it necessary to force the current in the signal winding to decrease proportionally to retain reading accuracy. Voltage feedback accommodates this requirement. For other embodiments, current feedback can be used in place of voltage feedback.

Figure 4:
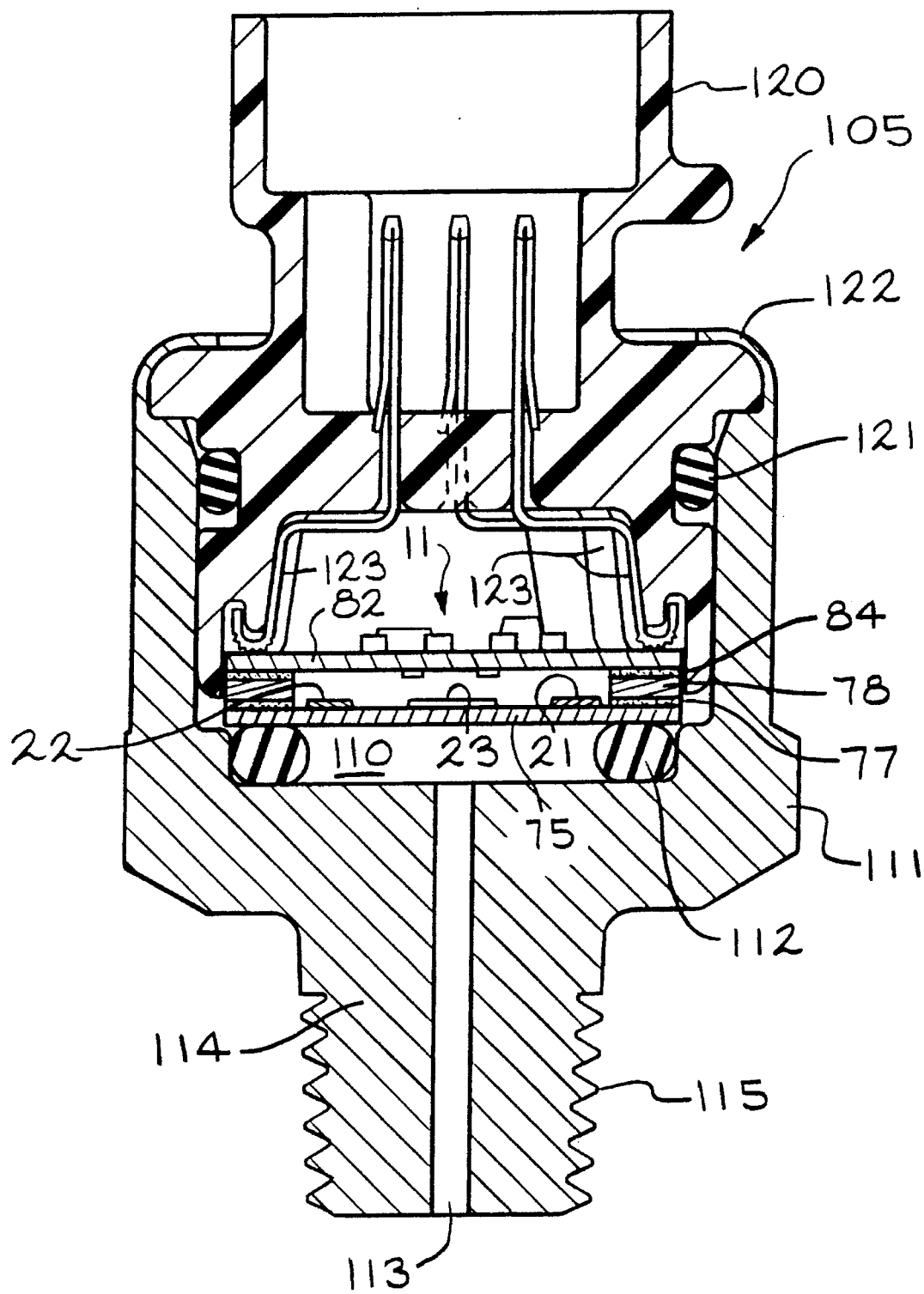
FIG. 4 is a cross-sectional elevational view of an oil pressure sensing unit using the transducer module shown in FIG. 2.

A typical application of the invention is as an oil pressure sensor, which is shown generally at 105 in FIG. 4. The transducer module 11 is disposed in a cavity 110 formed within an oil pressure sensor housing 111. A first O-ring 112 forms a seal between the module 11 and the sensor housing 111. A passageway 113 formed through an end portion 114 of the housing 111 admits oil into the cavity 110 and into contact with the module diaphragm 75. The sensor housing 111 has a threaded portion 115 formed on the exterior of the end portion 114 for securing the element to the device being monitored, such as a vehicle engine (not shown). The module 11 is retained within the cavity 110 by an electrical connector element 120 which is inserted into the cavity 110 above the module 11. A second O-ring 121 is disposed between the sides of the electrical connector element 120 and the cavity 110 to prevent contamination of the module 11. The oil pressure sensor housing 111 includes a top edge 122 which is crimped over the electrical connector element 120 to secure the connector element 120 and the module 11 in the cavity 110. For the embodiment shown in FIG. 4, the electrical connector element 120 includes a plurality of resilient prongs 123 which make electrical contact with the module contacts 31, 41 and 67 (not shown). The prongs 123 are shaped to assure that they are urged against the surface of the module 11 in order to form good electrical contacts.

The transducer module 11 disposed in the oil pressure sensor 105 also can include the auxiliary signal transistor 95, which would operate a low pressure warning light 96. The auxiliary signal transistor 95 also may be used to control other devices, such as turning off an electric fuel pump. Thus, should an engine equipped with this invention stall, the loss of oil pressure could be used to shut down the fuel supply. This would be an important safety feature in case of an accident.

While an oil pressure sensor has been described as an exemplary application, the invention may be used in many other applications. Both fluid and gas pressure can be measured by exposing the diaphragm 75 directly to the fluid or gas. With a differential connection and proper orifices, fluid or gas flow can be measured. When the invention is installed at the bottom of a tank containing fluid, the fluid quantity can be determined by weight. This application includes vehicle gas tanks and engine oil pans.

Direct weight measurement of small objects placed on the flexible diaphragm 75 is possible. Mechanical coupling to the diaphragm permits indirect weight measurement of large, heavy objects.

The addition of a pin to mechanically push the diaphragm 75 allows measurement of direct mechanical pressure. With this modification, the invention would provide a position measurement sensor for direct measurement of micro-inch distances. The invention could be incorporated into a phonograph cartridge. The invention would also be applicable as a high sensitivity profilometer transducer.

If mechanical tension or compression is applied along the diaphragm axis, the transducer can be used as a load link for measuring tension and compression in mechanical parts. The transducer could function as a sensor for measuring torque in shafts, such as automobile steering and drive shafts.

If a suitable thin substrate is used, sound pressure waves in air can be measured. Typical applications for this include; a blast or shock wave measurement transducer, a sound level measurement transducer, and a high quality microphone.

The transducer circuit 10 can be adapted to be an accelerometer by connecting a weight or a fluid chamber to the resilient diaphragm 75. Acceleration causes the weight or the fluid to press upon the diaphragm, deflecting the diaphragm proportional to the amount of acceleration.

There also are applications for the circuit and bridge arrangement where the bridge resistors 20, 21, 22 and 23 are not mounted upon a thin resilient diaphragm. For example, if one of the bridge resistors is temperature sensitive, temperature can be measured. If a temperature sensitive bridge resistor is warmed by bridge current, and then placed in a stream of gas or fluid, flow can be measured from the heat loss due to convection. If the flow sensing resistor is long, and placed in a container of fluid, the fluid level can be measured from the difference of convection of the fluid and the air above the fluid.

The basic circuit is convenient for measuring DC parameters of electronic parts. With respect to the bridge circuit, the circuit can be used as; a bridge null circuit, for precision measurement of resistors, and for operational amplifier measurements.

Figure 5:
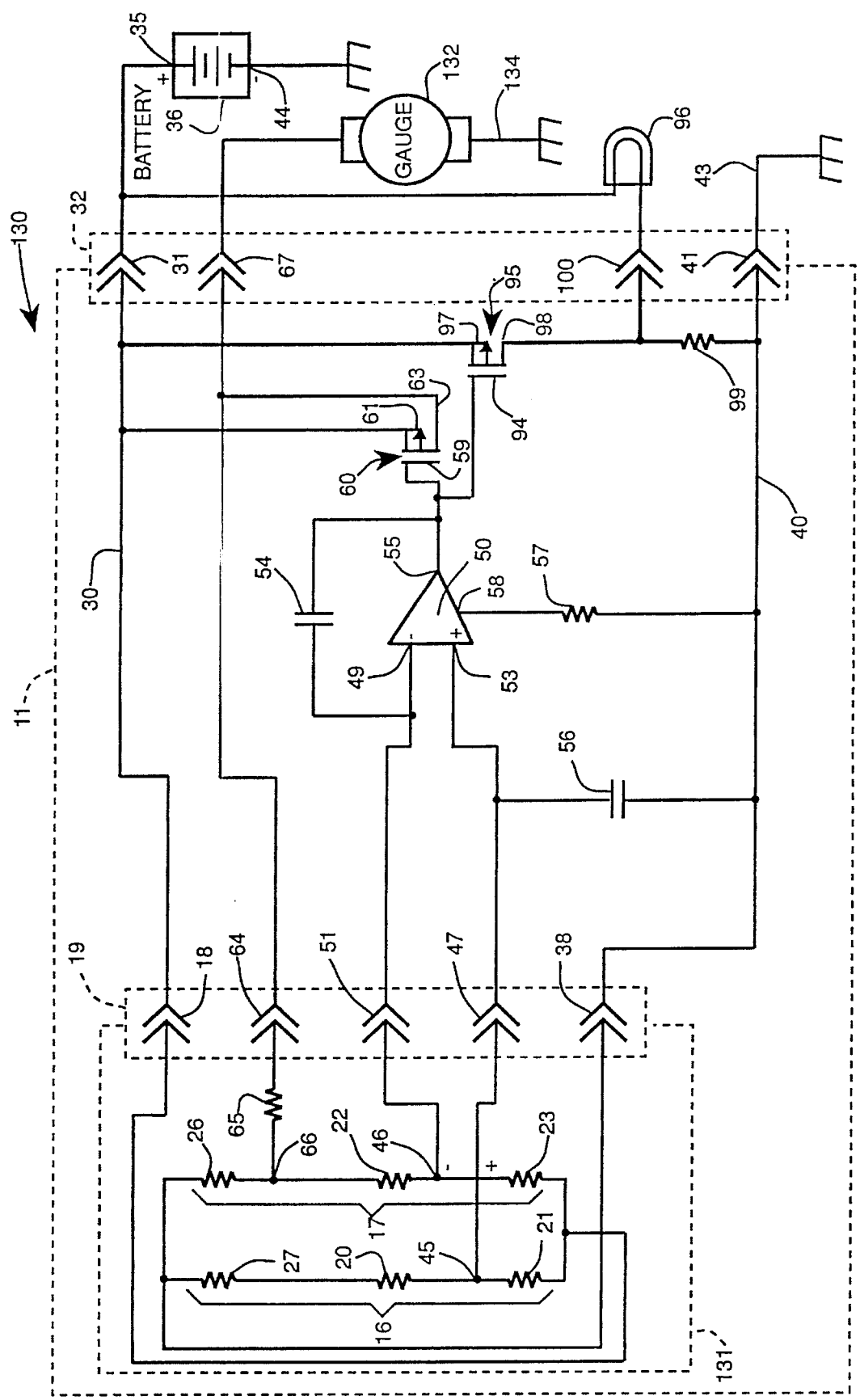
FIG. 5 is an alternate embodiment of the circuit shown in FIG. 1 which includes a grounded gauge.

The embodiment shown in FIG. 1 is arranged such that a zero bridge differential signal generates a maximum voltage at the difference amplifier output terminal 55. For applications requiring a zero output voltage from the difference amplifier for a zero bridge differential voltage, an alternate embodiment of the transducer circuit 130, as shown in FIG. 5, can be used. In FIG. 5, the circuit 130 includes a bridge 131 which is similar to the bridge 15 in FIG. 1, but inverted. The circuit 130 also includes a gauge 132 connected between the output signal contact 67 and ground 134. The input connections to the difference amplifier 50 have been reversed from what is shown in FIG. 1. Thus, the left bridge output terminal 45 is connected to the positive input terminal 53 and the right bridge output terminal 46 is connected to the negative input terminal 49. Similarly, the source and drain terminals 61 and 63 of the power transistor 60 and the source and drain terminals 97 and 98 of the auxiliary signal transistor 95 have been reversed. With the reversal of the source and drain terminals 97 and 98 of the auxiliary signal transistor 95, the current limiting resistor 99 is connected to the circuit ground buss 40. Likewise, the warning light 96 is connected between the warning light output contact 100 and the positive terminal 35 of the battery 36.

For the alternate embodiment shown in FIG. 5, the connecting resistors 48 and 52 shown in FIG. 1 between the bridge output terminals 45 and 46 and the difference amplifier input terminals 49 and 53 have been omitted. Thus, the circuit response time is a function of only the bridge internal resistances and the integrating capacitors 54 and 56. This provides a faster response time than the circuit shown in FIG. 1. A faster response time is needed in many applications, such as when supplying data to an engine microprocessor.

Figure 6:
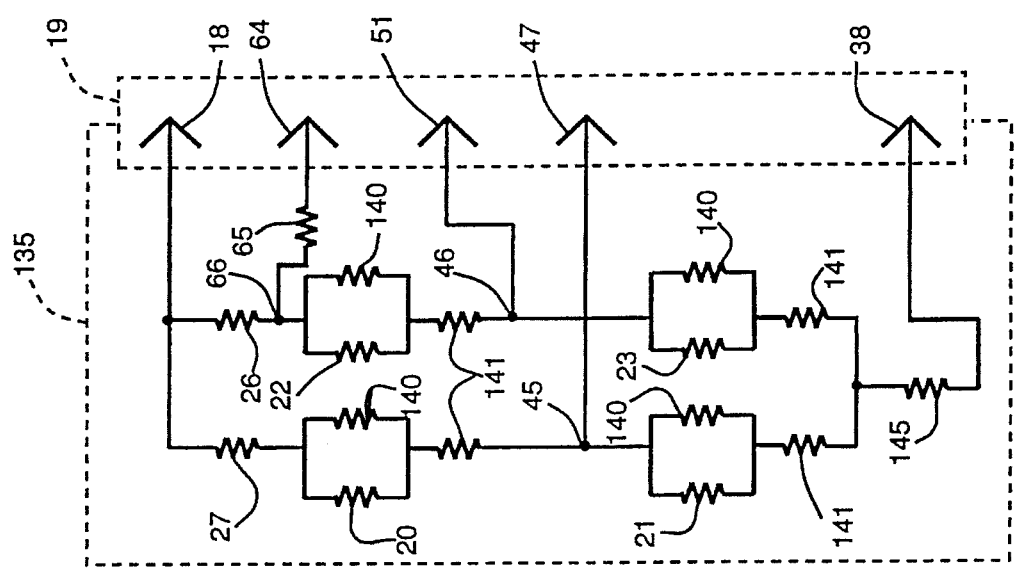
FIG. 6 is an alternate embodiment of the bridge circuit shown in FIG. 1 which includes trimming resistors.

An alternate embodiment 135 of the bridge circuit 15 is shown in FIG. 6 which includes a shunt trim resistor 140 and a series trim 141 resistor connected to each of the sensing resistors 20, 21, 22 and 23. The trim resistors 140 and 141 are trimmed to initially balance the bridge 135. In this embodiment, the sensing resistor 21 can have a fixed value. It is also possible to use either a shunt or a series trim resistor instead of both. In addition, the lower ends of the bridge arms 16 and 17 can be attached to ground through an adjustable resistor 145. The adjustable resistor 145 can be varied to compensate for temperature variations or to adjust circuit gain.

For other embodiments of the invention, the inherent gain of the difference amplifier 50 may be sufficient to drive the circuit load. In these cases, the additional amplification provided by the power transistor 60 may not be needed and the difference amplifier output 55 can be connected directly to the feedback resistor 65 and the output signal contact 67.

Figure 7:
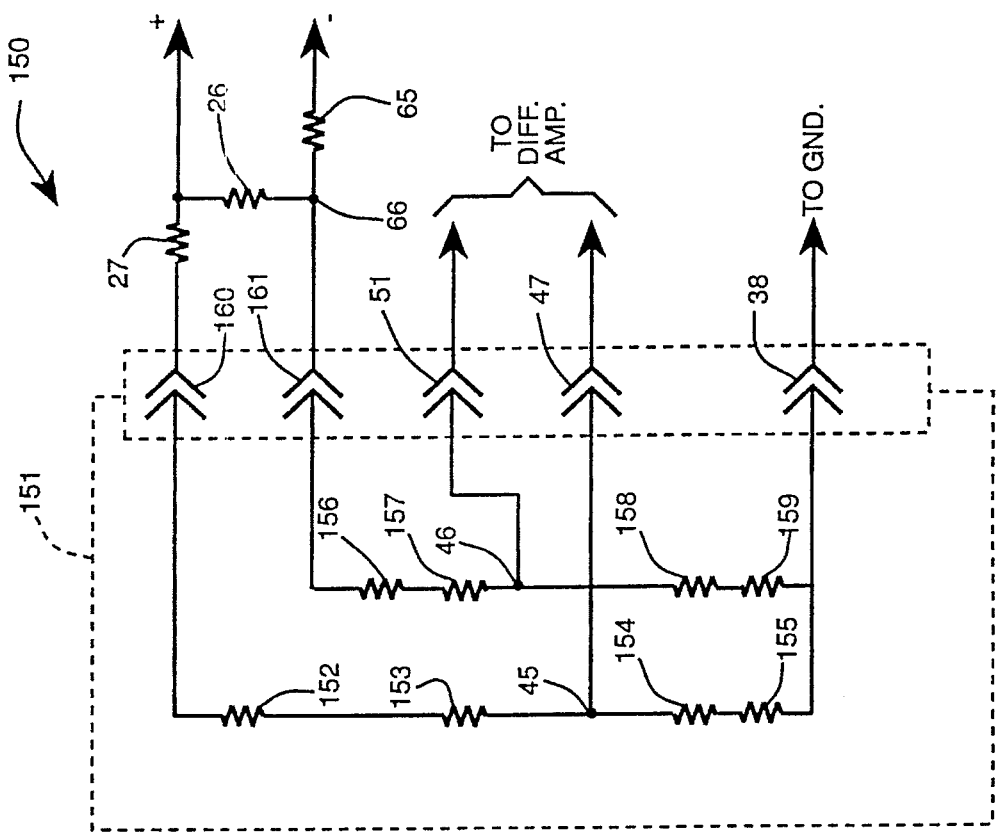
FIG. 7 is another alternate embodiment of the bridge circuit shown in FIG. 1.

Another embodiment 150 of the bridge circuit 15 is shown in FIG. 7 which has only the pressure responsive resistors secured to a thin resilent diaphragm 151, shown in phantom. The bridge feedback resistor 26, the bridge trim resistor 27 and the feedback resistor 65 are removed from the diaphragm 151. As will be explained below, the upper left arm of the bridge 150 includes a first pair of equal sensing resistors 152 and 153 formed from a stress responsive material. The pair of resistors 152 and 153 are connected in series and replace the single upper left sensing resistor 20 shown in FIG. 1. Similarly, the lower left arm of the bridge 150 includes a second pair of equal sensing resistors 154 and 155 formed from a stress responsive material and connected in series. The upper right arm of the bridge 150 also includes a third pair of equal sensing resistors 156 and 157 formed from a stress responsive material and connected in series. Finally, the lower right arm of the bridge 150 includes a fourth pair of equal sensing resistors 158 and 159 formed from a stress responsive material and connected in series. The upper left pair of sensing resistors 152 and 153 are connected through an internal connector 160 to the bridge trim resistor 27. Similarly, the upper right pair of sensing resistors 156 and 157 are connected through an internal connector 161 to the bridge feedback resistor 26 and the feedback resistor 65. The remaining connections to the transducer circuit 10 are the same as shown in FIG. 1 and are accordingly numbered similarly.

Figure 8:
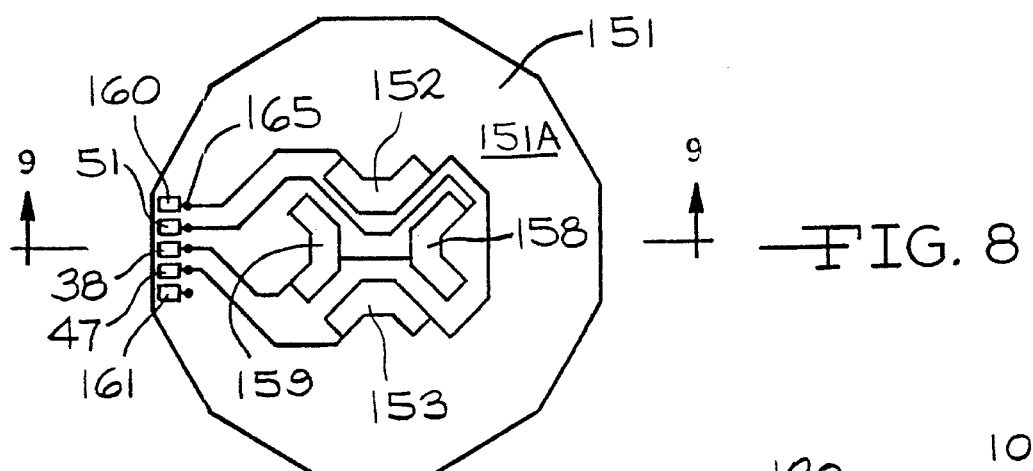
FIG. 8 is a top plan view of a resilent diaphragm and sensing resistors used with the circuit shown in FIG. 7.
Figure 9:
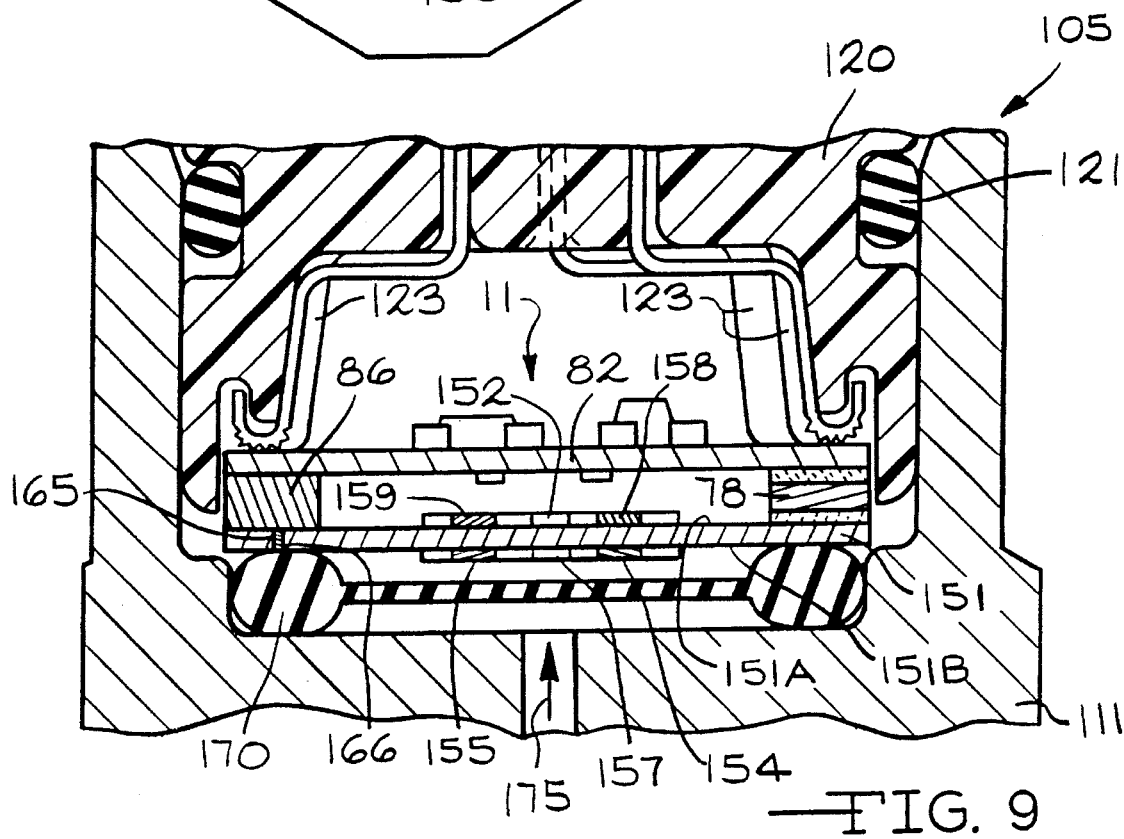
FIG. 9 is a enlarged partial sectional view taken along line 9—9 in FIG. 8.
Figure 10:
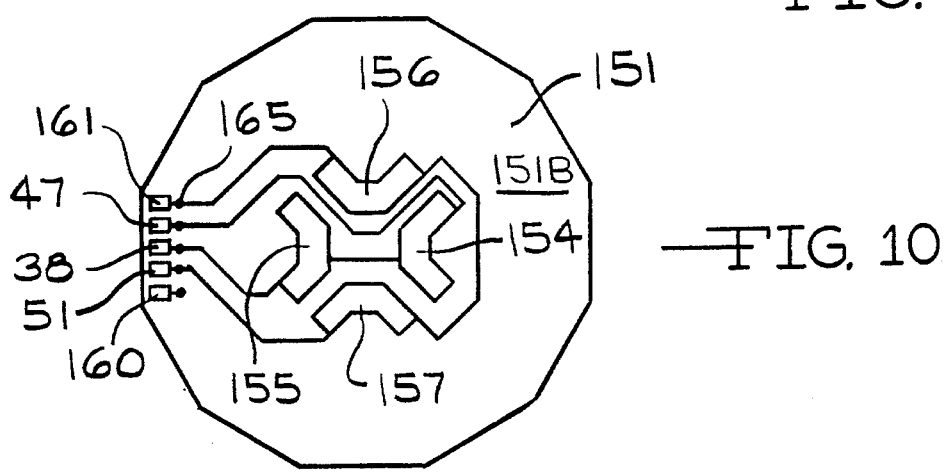
FIG. 10 is a bottom plan view of the diaphragm show in FIG. 8.

The arrangement of the pairs of sensing resistors upon the resilent diaphragm 151 is illustrated in FIGS. 8 through 10. While the diaphragm 151 is shown in FIGS. 8 and 10 as a 12 sided polygon, the diaphragm 151 can be shaped as any regular polygon or as a circle. The diaphragm 151 has a top surface 151a and a bottom surface 151b. The first and fourth sensing resistor pairs 152 and 153 and 158 and 159 are formed on the top surface 151a of the diaphragm 151. The resistors are positioned as close to the center of the diaphragm 151 as possible. The first pair of resistors 152 and 153 alternate with the fourth pair of resistors 158 and 159 in a generally circular pattern. The resistors are spaced equally about the pattern so formed. The individual resistors have a C-shape with a central portion facing the center of the diaphragm 151 and arm portions extending radially outward towards the diaphragm perimeter. Similarly, as shown in FIG. 10, the second and third sensing resistor pairs 154 and 155 and 156 and 157 are formed on the bottom surface 151b of the diaphragm 151. The bottom resistors are shaped exactly as the top resistors. Furthermore, the second resistor pair 154 and 155 is positioned exactly below the fourth resistor pair 158 and 159. Similarly, the third resistor pair 156 and 157 is positioned exactly below the first resistor pair 152 and 153. The sensing resistors located on the bottom surface 151b are connected by feedthrough pads 165 to the sensing resistors located upon the top surface 151a. The feedthrough pads pass through apertures 166 formed through the diaphragm 151.

As shown in FIG. 9, the diaphragm 151 forms the lower substrate of the sealed module 11 containing the transducer circuit 10. The diaphragm 151 is secured to the support ring 78 which carries the upper substrate 82. The support ring 78 and the upper substrate 82 have the same shape as the diaphragm 151. In FIG. 9, the module 11 is shown included in the oil pressure sensor 105 described above and illustrated in FIG. 4. Accordingly, only a partial view of the sensor 105 is included in FIG. 9 and corresponding parts are numbered the same. As shown in FIG. 9, a combined O-ring and diaphragm 170 form a resilent seal across the bottom surface 151b of the diaphragm 151. This protects the sensing resistors 154, 155, 156 and 157 and electrical connections located thereon.

The operation of the alternate bridge circuit 150 will now be explained. The bottom surface 151b of the diaphragm 151 is exposed to the force being measured, represented by an arrow labeled 175 in FIG. 9. It is to be understood that the bridge 150 will also work if the force is applied to the diaphragm top surface 151a. In FIG. 9, the force 175 acts in an upward direction, causing the diaphragm 151 to deflect upward. As the diaphragm 151 deflects, the first and fourth pairs of sensing resistors 152 and 153 and 158 and 159 formed on the diaphragm top surface 151a are subjected to radial tensile stresses. The tensile stresses cause these resistors to increase in resistive value. At the same time, the second and third pairs of sensing resistors 154 and 155 and 156 and 157 formed on the diaphragm bottom surface 151b are subjected to radial compressive stresses. The compressive stresses cause these resistors to decrease in resistive value. The changes in the values of the sensing resistors unbalance the bridge 150 causing a voltage to appear between the bridge output terminals 45 and 46. The remainder of the transducer circuit 10 then responds as described above. Because all the sensing resistors are located close to the center of the diaphragm 151, maximum stresses are sensed by the resistors which increases the sensitivity of the transducer circuit 10.

While the bridge 150 has been described as having pairs of sensing resistors, a plurality of equal resistors can be used for the sensing resistors. The resistors would be connected in series and arranged upon the diaphragm in an alternating pattern similar to the one shown in FIGS. 8 and 10. As described above, each individual resistor formed upon the diaphragm bottom surface 151b would be opposite a corresponding individual resistor formed upon the top surface 151a.

In accordance with the provisions of the patent statutes, the principle and mode of operation of this invention have been explained and illustrated in its preferred embodiment. However, it must be understood that this invention may be practiced otherwise than as illustrated without departing from its spirit or scope.

What is claimed is:

1. A transducer circuit comprising:

a. means responsive to a variable condition, said condition varying from a first value to a second value;

b. a bridge circuit having at least one arm including said responsive means and first and second output terminals, said bridge circuit having a first output voltage between said output terminals when said responsive means is subjected to said first condition value and having a second output voltage between said output terminals different from said first output voltage when said responsive means is subjected to said second condition value;

c. means for establishing a transducer output signal at an output terminal which is a function of an integral of said bridge circuit output voltage, said establishing means including:

(1) a difference amplifier having a first input terminal coupled to said first bridge circuit output terminal, a second input terminal coupled to said second bridge circuit output terminal, and an output terminal coupled to said establishing means output terminal;

(2) a first integrating capacitor connected between said difference amplifier first input terminal and said difference amplifier output terminal;

(3) a second integrating capacitor connected between said difference amplifier second input terminal and a circuit ground;

(4) a first resistor connected between said difference amplifier first input terminal and said first bridge circuit output terminal; and (5) a second resistor connected between said difference amplifier second input terminal and said second bridge circuit output terminal;

said difference amplifier and said integrating capacitors cooperating to establish said transducer output signal; and further wherein the product of the values of said first integrating capacitor and said first resistor defines a first time constant and the product of the values of said second integrating capacitor and said second resistor defines a second time constant that is less than said first time constant; and d. negative feedback means coupling said transducer output signal to said bridge circuit to return said bridge output voltage from said second output voltage to said first output voltage.

2. A transducer circuit, as set forth in claim 1, wherein said first difference amplifier input terminal is a negative input terminal.

3. A transducer circuit comprising:

a. a resilient diaphragm exposed to a variable force, said force varying from a first value to a second value and said diaphragm having a predetermined deflection change in response to a predetermined force change;

b. a bridge circuit mounted on said diaphragm and having at least one arm electrically connected to said diaphragm and having first and second output terminals, said bridge circuit having a first output voltage between said output terminals when said diaphragm is subjected to said first force value and having a second output voltage between said output terminals different from said first output voltage when said diaphragm is subjected to said second force value;

c. means for establishing a transducer output signal at an output terminal which is a function of an integral of said bridge circuit output voltage, wherein said establishing means includes a difference amplifier having a first input terminal coupled to said first bridge circuit output terminal, a second input terminal coupled to said second bridge circuit output terminal and an output terminal coupled to said establishing means output terminal, a first integrating capacitor connected between said difference amplifier first input terminal and said difference amplifier output terminal, and a second integrating capacitor connected between said difference amplifier second input terminal and a circuit ground, said difference amplifier and said integrating capacitors cooperating to establish said transducer output signal; and d. negative feedback means coupling said transducer output signal to said bridge circuit to return said bridge output voltage from said second output voltage to said first output voltage.

4. A transducer circuit, as set forth in claim 3, wherein said establishing means further includes a first resistor connected between said difference amplifier first input terminal and said first bridge circuit output terminal, and a second resistor connected between said difference amplifier second input terminal and said second bridge circuit output terminal, and further wherein the product of the values of said first integrating capacitor and said first resistor defines a first time constant and the product of the values of said second integrating capacitor and said second resistor defines a second time constant that is less than said first time constant.

5. A transducer comprising:

means responsive to a variable condition;

a bridge circuit associated with said responsive means, said bridge circuit including first and second output terminals, said bridge circuit having an output voltage between said output terminals when said responsive means is subjected to said variable condition, said bridge circuit having an arm which includes a sensing element connected in series with a bridge feedback element, said sensing element and said bridge feedback element defining a junction therebetween, said bridge circuit also including a means for adjusting said bridge output voltage to a predetermined value when said responsive means is subjected to a specified variable condition;

means connected to said bridge circuit output terminals for generating an electrical signal at a transducer output terminal which is a function of said bridge output voltage; and feedback means coupling said transducer output to said junction of said bridge sensing element and said bridge feedback element, said feedback means including a transducer feedback resistor, said transducer output signal being a function of said transducer feedback resistor, said transducer feedback resistor being trimmed independently of said means for adjusting bridge output to adjust said transducer output signal.

6. A transducer comprising:

a resilent diaphragm having first and second surfaces, said diaphragm exposed to a variable condition and having a predetermined deflection change in response to a predetermined change in said variable condition, said deflection causing radial stress within said diaphragm;

a bridge circuit disposed upon said diaphragm, said bridge circuit including first and second sets of resistors formed from a stress responsive material upon said first diaphragm surface, said first set of resistors including a plurality of individual resistors connected in series, said second set of resistors including a plurality of individual resistors connected in series, said bridge circuit further including third and fourth sets of resistors formed from a stress responsive material upon said second diaphragm surface, said third set of resistors including a plurality of individual resistors connected in series, said fourth set of resistors including a plurality of individual resistors connected in series, said individual resistors of said third set of resistors formed directly opposite said individual resistors of said first set of resistors and said individual resistors of said fourth set of resistors formed directly opposite said individual resistors of said second set of resistors, said individual resistors responsive to said diaphragm radial stress, said bridge circuit further including first and second output terminals, said bridge circuit having an output voltage between said output terminals when said resistors respond to said diaphragm radial stress; and means connected to said bridge circuit output terminals for generating an electrical signal at a transducer output terminal which is a function of said bridge circuit output voltage.

7. A transducer, as claimed in claim 6, wherein said diaphragm is a disk having a regular polygon shape.

8. A transducer, as claimed in claim 6, wherein said diaphragm is a disk having a circular shape.

9. A transducer, as claimed in claim 6, wherein said first and second sets of resistors are formed having a circular pattern upon said diaphragm first surface.

10. A transducer, as claimed in claim 9, wherein said individual resistors of said first set of resistors alternate with said individual resistors of said second set of resistors about said circular pattern.

11. A transducer, as claimed in claim 6, wherein said individual resistors have end portions extending outwardly towards the circumference of said diaphragm.

12. A transducer, as claimed in claim 6, wherein said individual resistors formed on said second diaphragm surface have the same shape as said individual resistors formed on said first diaphragm surface.

13. A transducer circuit comprising:

means responsive to a variable condition, said condition varying from a first value to a second value;

a bridge circuit having at least one arm including said responsive means and first and second output terminals, said bridge circuit having a first output voltage between said output terminals when said responsive means is subjected to said first condition value and having a second output voltage between said output terminals different from said first output voltage when said responsive means is subjected to said second condition value;

means for establishing a transducer output signal at an output terminal which is a function of an integral of said bridge output voltage, said establishing means including a difference amplifier having a first input terminal coupled to said first bridge circuit output terminal, a second input terminal coupled to said second bridge circuit output terminal and an output terminal coupled to said establishing means output terminal, a first integrating capacitor connected between said difference amplifier first input terminal and said difference amplifier output terminal, and a second integrating capacitor connected between said difference amplifier second input terminal and a circuit ground, said difference amplifier and said integrating capacitors cooperating to establish said transducer output signal;

a first resistive element coupling said first integrating capacitor to a first arm of said bridge circuit, the product of the values of said first resistive element and said first integrating capacitor defining a first time constant;

a second resistive element coupling said second integrating capacitor to a second arm of said bridge circuit, the product of the values of said second resistive element and said second integrating capacitor defining a second time constant which is less than said first time constant; and negative feedback means coupling said transducer output signal to said bridge circuit to return said bridge output voltage from said second output voltage to said first output voltage.

14. A transducer circuit, as set forth in claim 13, wherein said first resistive element is included in said first bridge circuit arm.

15. A transducer circuit, as set forth in claim 14, wherein said second resistive element is included in said second bridge circuit arm.

16. A transducer circuit, as set forth in claim 13, wherein said first resistive element is connected between said first input terminal of said difference amplifier and said first bridge circuit output terminal.

17. A transducer circuit, as set forth in claim 16, wherein said second resistive element is connected between said second input terminal of said difference amplifier and said second bridge circuit output terminal.

18. A transducer circuit, as set forth in claim 13, wherein said first difference amplifier input terminal is a negative input terminal.

19. A transducer circuit comprising:

a resilient diaphragm which is exposed to a variable force, said diaphragm having a predetermined deflection change in response to a predetermined force change, said force varying from a first value to a second value;

a bridge circuit mounted upon said diaphragm and having at least one arm responsive to deflection thereof, said bridge circuit including first and second output terminals, said bridge circuit having a first output voltage between said output terminals when said diaphragm is subjected to said first force value and having a second output voltage between said output terminals different from said first output voltage when said diaphragm is subjected to said second force value;

means for establishing a transducer output signal at an output terminal which is a function of an integral of said bridge output voltage, said establishing means including a difference amplifier having a first input terminal coupled to said first bridge circuit output terminal, a second input terminal coupled said second bridge circuit output terminal and an output terminal coupled to said establishing means output terminal, a first integrating capacitor connected between said difference amplifier first input terminal and said difference amplifier output terminal, and a second integrating capacitor connected between said difference amplifier second input terminal and a circuit ground, said difference amplifier and said integrating capacitors cooperating to establish said transducer output signal; and negative feedback means coupling said transducer output signal to said bridge circuit to return said bridge output voltage from said second output voltage to said first output voltage.

20. A transducer circuit, as set forth in claim 19, wherein said establishing means further includes a first resistor connected between said difference amplifier first input terminal and said first bridge circuit output terminal and a second resistor connected between said difference amplifier second input terminal and said second bridge circuit output terminal, and further wherein the product of the values of said first integrating capacitor and said first resistor defines a first time constant and the product of the values of said second integrating capacitor and said second resistor defines a second time constant which is less than said first time constant.

21. A transducer comprising:

a resilient diaphragm having a circular disk shape and a thickness mounted upon a rigid ring shaped supporting structure, said diaphragm exposed to a variable condition and having a predetermined deflection change in response to a predetermined change in said variable condition, said deflection causing radial stress within said diaphragm;

a bridge circuit disposed upon said diaphragm, said bridge circuit including an arcuate shaped resistor concentrically positioned upon said diaphragm within said supporting structure and separated from the inner surface of said supporting structure by a predetermined radial distance which is equal to said diaphragm thickness, said arcuate resistor responsive to said diaphragm radial stress, said bridge circuit further including first and second output terminals, said bridge circuit having an output voltage between said output terminals when said resistor responds to said diaphragm stress; and means connected to said bridge circuit output terminals for generating an electrical signal at a transducer output terminal which is a function of said bridge circuit output voltage.

* * * * *